Nov. 3, 1959  R. E. SALBECK ET AL  2,910,727
LOADING AND UNLOADING APPARATUS FOR A PRESS
Filed April 30, 1956  2 Sheets-Sheet 1
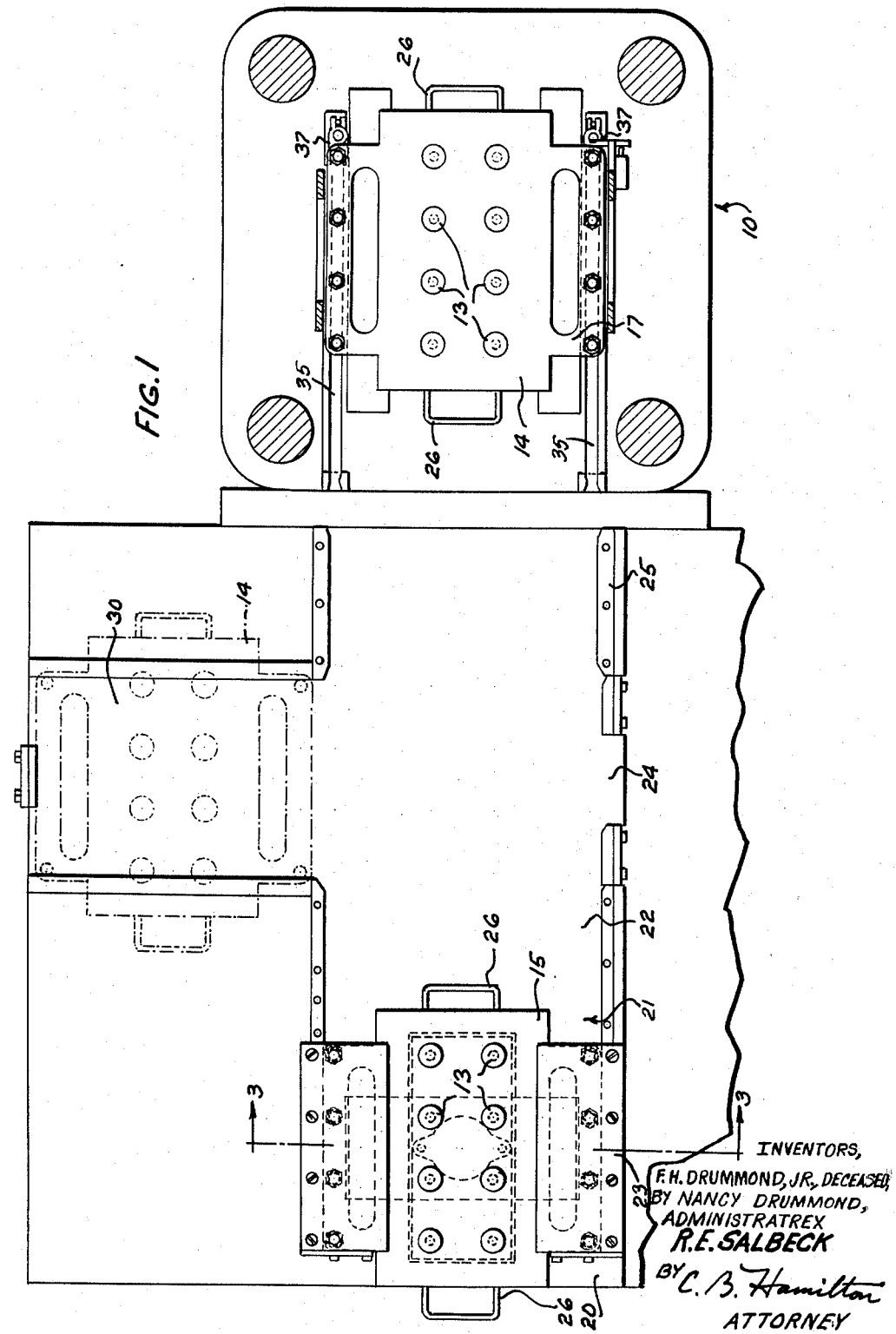
INVENTORS,
F.H. DRUMMOND, JR., DECEASED,
BY NANCY DRUMMOND,
ADMINISTRATREX
R.E. SALBECK
BY C. B. Hamilton
ATTORNEY Nov. 3, 1959  R. E. SALBECK ET AL  2,910,727
LOADING AND UNLOADING APPARATUS FOR A PRESS
Filed April 30, 1956  2 Sheets-Sheet 2
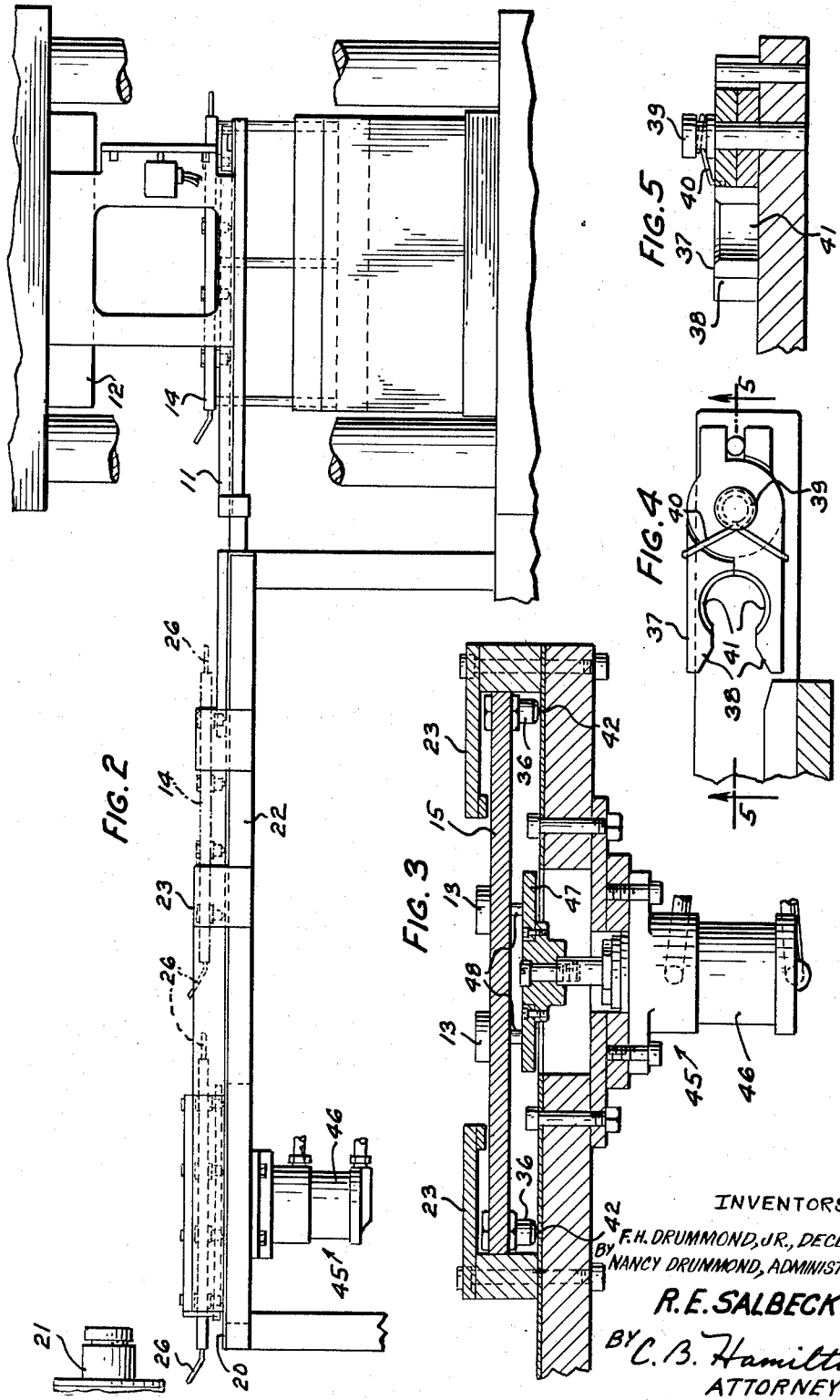
INVENTORS,
F.H. DRUMMOND, JR., DECEASED,
BY NANCY DRUMMOND, ADMINISTRATRIX.
R.E. SALBECK
BY C. B. Hamilton
ATTORNEY United States Patent Office 2,910,727
Patented Nov. 3, 1959

2,910,727

LOADING AND UNLOADING APPARATUS FOR A PRESS

Raymond E. Salbeck, Lawrence, and Fred H. Drummond, Jr., deceased, late of Indianapolis, Ind., by Nancy Drummond, administratrix, Indianapolis, Ind., assignors to Western Electric Company, Incorporated, New York, N.Y., a corporation of New York Application April 30, 1956, Serial No. 581,602

3 Claims. (Cl. 18—16)

This invention relates to molding apparatus, and more particularly to apparatus for loading and unloading molding presses.

An object of the invention is to provide new and improved molding apparatus.

Another object of the invention is to provide new and improved apparatus for loading and unloading molding presses.

A further object of the invention is to provide apparatus for guiding a loaded tray into a molding press and a tray carrying molded parts out of the press without interference between the two trays.

A molding press illustrating certain features of the invention may include a pair of opposed platens and a plurality of trays, each constituting a mold, carrying molding material therein and movable to a molding position between the platens. A guideway is provided along which each mold may be slid into the press and backed out of the press between a loading position and a molding position, and the guideway may be provided with a lateral branch for receiving one of the trays while the other one is moved along the guideway from the loading position into the press.

A complete understanding of the invention may be obtained from the following detailed description of a molding apparatus and a specific embodiment thereof when read in conjunction with the appended drawings, in which Fig. 1 is a top plan view, with portions broken away, of a molding press forming one embodiment of the invention;

Fig. 2 is a fragmentary side elevation of the press shown in Fig. 1;

Fig. 3 is a vertical section taken along line 3—3 of Fig. 1;

Fig. 4 is an enlarged top plan view of a portion of the apparatus shown in Fig. 1, and Fig. 5 is a fragmentary vertical section taken along line 5—5 of Fig. 4.

Referring now in detail to the drawings, there is shown therein a molding apparatus of a compression molding type for molding internally threaded telephone handset caps, and the apparatus includes a press 10 having a fixed bottom platen 11 relative to which a movable upper platen 12 may be moved to press pressers or cores 13 carried by trays 14 and 15 to form the caps in the trays, which serve as molds. The trays 14 and 15 are movable from a loading and unloading station 20, which is adjacent to a core extracting fixture 21, along a guideway 22 having rails 23, 24 and 25 into and on the platen 11, the trays having handles 26 thereon to facilitate such movement. A branch guideway 30 extending laterally from the guideway 22 is provided intermediate the ends of the guideway 22 and serves to receive each of the trays 14 and 15 after that tray has been removed from the press 10 to clear the guideway 22 to permit the other tray to be inserted into the press after it has been loaded with plastic molding material and the core details 13.

When one of the trays enters the press, it travels along the guide rails 35 and legs 36 of the trays snap into latches 37, which are composed of opposed arms 38 mounted pivotally on pins 39 and urged toward one another by torsion springs 40. The arms 38 are provided with arcuate notches 41, which fit closely around the legs 36 to precisely locate the trays in the molding press. Each of the legs 36 also carries a ball bearing 42 therein for supporting the tray for easy movement along the guideways 22 and 30 and the bottom platen 11, the ball bearings 42 permitting a universal movement of the trays, lateral as well as longitudinal, along the guideways.

A core ejecting mechanism 45 is provided at the station 20 and includes a pneumatic cylinder 46 and a knockout plate 47 having pins 48 which may be pushed into the molding cavities and the trays 14 and 15 to eject the molded caps and the core details or pressers 13 in the trays, the rails 23 serving to prevent upward movement of the trays 14 and 15 during ejection of the parts.

Operation

Assuming the tray 14 to have been in the press 10 and to have been removed therefrom and slid along the guideway 22 to the guideway 30, the tray 14 then is slid laterally into the bypass guideway 30 to clear the guideway 22. Then the tray 15, which has been loaded with cores 13 and molding material, is slid along the guideway 22 onto the lower platen 11 until the legs 36 snap into the latches or stops 37, and the press 10 then is actuated to move the upper platen 12 downwardly toward the tray 15 and maintain the compression molding material under heat and pressure. While the caps are being molded in the tray 15, the tray 14 is rolled laterally onto the guideway 22 and is moved into the unloading position or station 20. Then the ejector 45 is actuated to eject the cores 13 and the parts molded thereon. Then the tray 14 is loaded with alternate pressers or cores 13 and compression molding material, and the ejected caps and cores are unscrewed from their core details by the fixture 21. Then, after the curing cycle of the tray 15 has been completed, the press is opened, the tray 15 is removed therefrom and into the bypass station or guideway 30, and the tray 14 is inserted into the press after which the operation described hereinabove is repeated.

The above-described apparatus permits the trays 14 and 15 to be loaded and unloaded, fed into and out of the press without ever lifting the trays with the parts thereon and provides very rapid loading and unloading of the trays.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for loading and unloading a press, a guideway having a main portion extending into the press and a bypass portion extending laterally thereof, a molding tray movable from a loading position at one end of the guideway along said main portion into the press, a second molding tray also movable along the guideway between the loading position and the press, each of said trays also being movable into the bypass portion to permit the other tray to pass along the main portion of the guideway, and guide rails extending around the perimeter of said guideways for restricting movement of the molding trays.

2. In an apparatus for carrying articles to and from a press, a guideway having a primary portion extending from an unloading station to the press, said guideway having a secondary portion extending transversely to said primary portion intermediate the press and unloading station, a first loading tray movable along said guideway between the unloading station and the press for supporting and transporting articles, a second loading tray movable along said guideway and into the secondary portion thereof during the movement of said first tray from the unloading station to the press for supporting and transporting articles, guide rails extending around the perimeter of the guideway to restrict the movement of the trays, and movable means positioned at the unloading station and extendable through the guideway for removing the articles from the trays.

3. In an apparatus for carrying articles to and from a press, a guideway having a primary portion extending from an unloading station to the press, said guideway having a secondary portion extending transversely to said primary portion intermediate the unloading station and press, a pair of loading trays adapted to be moved along said guideway and having apertures therein over which articles are positioned, each of said trays having a plurality of legs extending from the bottom thereof and having bearings rotatably mounted therein for moving the trays in spaced relationship to the guideways, guide rails extending around the perimeter of the guideway to restrict the movement of the trays, spring biased latching means mounted in said guideway to engage the legs to hold the tray within the press, a plate reciprocable from the surface of the guideway at the unloading station and having pins extending upwardly therefrom to project through the apertures in the tray for unloading the articles from the tray, means for moving said plate upon a tray loaded with articles being positioned in the unloading station, and guide rail extensions at the unloading station for preventing upward movement of the trays during unloading of articles.

References Cited in the file of this patent

UNITED STATES PATENTS

| | | |
|---|---|---|
| 293,362 | Schenck | Feb. 12, 1884 |
| 1,720,763 | Siebs | July 16, 1929 |
| 1,904,239 | Johnson et al. | Apr. 18, 1933 |
| 2,253,301 | Kath et al. | Aug. 19, 1941 |
| 2,317,440 | Cannon | Apr. 27, 1943 |
| 2,704,608 | Graf et al. | Mar. 22, 1955 |